(12) United States Patent
Conicella

(10) Patent No.: US 6,619,040 B2
(45) Date of Patent: Sep. 16, 2003

(54) INTERNAL COMBUSTION ENGINE PROVIDED WITH A DECOMPRESSION-TYPE BRAKING DEVICE AND WITH A TURBOCHARGER HAVING A VARIABLE GEOMETRY TURBINE

(75) Inventor: Fabrizio Conicella, Turin (IT)

(73) Assignee: Iveco Fiat S.p.A., Turin (IT)

( * ) Notice: Subject to any disclaimer, the term of this patent is extended or adjusted under 35 U.S.C. 154(b) by 0 days.

(21) Appl. No.: 10/043,278

(22) Filed: Jan. 14, 2002

(65) Prior Publication Data
US 2002/0157396 A1 Oct. 31, 2002

(30) Foreign Application Priority Data
Jan. 16, 2001 (IT) .................. TO2001A0029

(51) Int. Cl.[7] ............................................. F02D 23/00
(52) U.S. Cl. ......................................... 60/602; 60/603
(58) Field of Search .................. 60/600–603; 123/320

(56) References Cited

U.S. PATENT DOCUMENTS

| | | | | |
|---|---|---|---|---|
| 4,656,834 A | * | 4/1987 | Elpern | 60/602 |
| 4,779,423 A | * | 10/1988 | Szczupak | 60/602 |
| 5,025,629 A | * | 6/1991 | Woollenweber | 60/602 |
| 5,410,882 A | * | 5/1995 | Davies et al. | 60/602 |
| 5,444,980 A | * | 8/1995 | Dellora et al. | 60/602 |
| 6,050,093 A | * | 4/2000 | Daudel et al. | 60/602 |
| 6,220,032 B1 | * | 4/2001 | Schmidt et al. | 60/602 |
| 6,256,991 B1 | * | 7/2001 | Schmidt et al. | 60/602 |
| 6,256,992 B1 | * | 7/2001 | Lewis et al. | 60/603 |
| 6,260,358 B1 | * | 7/2001 | Daudel et al. | 60/602 |
| 6,435,167 B1 | * | 8/2002 | Finger et al. | 60/602 |
| 6,497,097 B2 | * | 12/2002 | Schmidt et al. | 60/602 |

FOREIGN PATENT DOCUMENTS

| | | |
|---|---|---|
| DE | 42 32 400 C1 | 8/1993 |
| DE | 197 27 140 | 12/1998 |
| EP | 0 543 210 A1 | 5/1993 |

* cited by examiner

Primary Examiner—Thomas Denion
Assistant Examiner—Thai-Ba Trieu
(74) Attorney, Agent, or Firm—Liniak, Berenato & White

(57) ABSTRACT

An internal combustion engine provided with a decompression-type braking system and with a turbocharger having a variable geometry turbine, in which the effective flow section of the gases entering the turbine under the maximum braking power condition is maintained at least equal to a safety limit value calculated on the basis of geometrical characteristics and of limit values of operating parameters of the engine and of the turbocharger for the purpose of achieving the maximum braking power compatible with the safety of the engine and of the turbocharger.

9 Claims, 2 Drawing Sheets

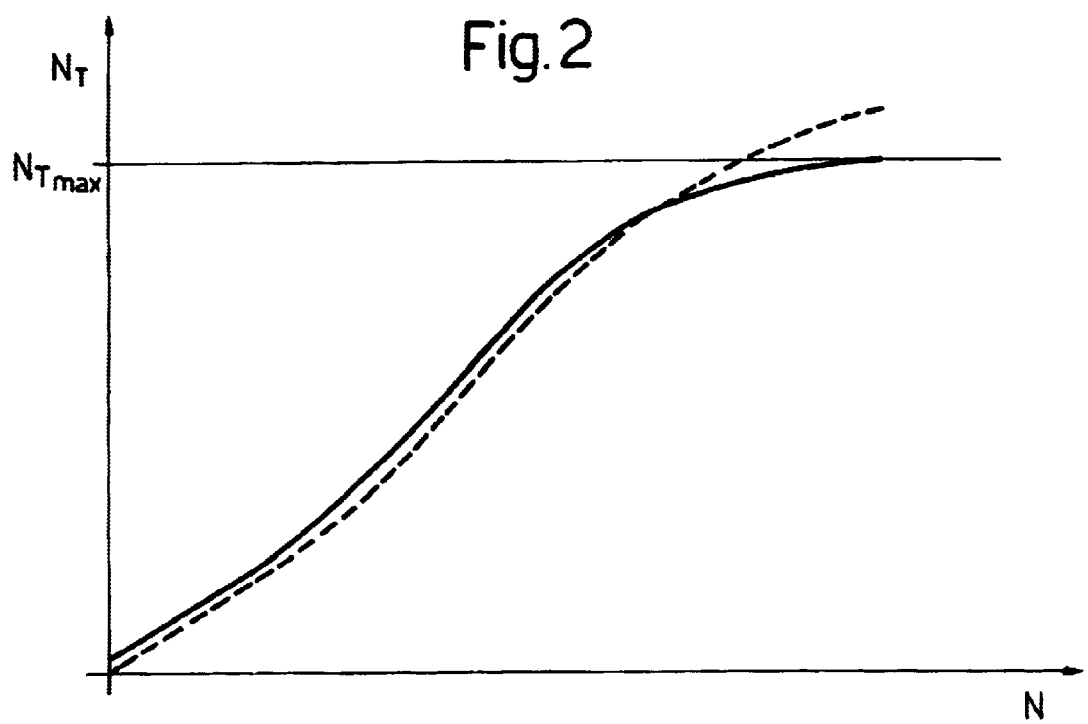
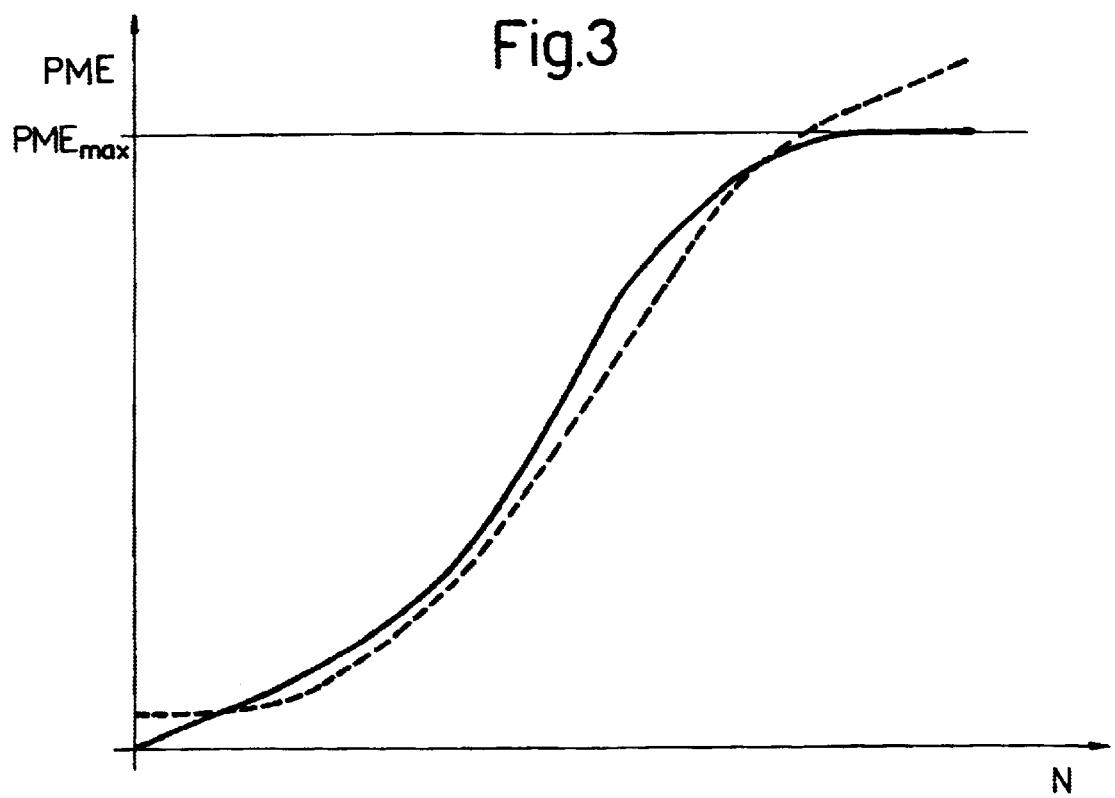

INTERNAL COMBUSTION ENGINE PROVIDED WITH A DECOMPRESSION-TYPE BRAKING DEVICE AND WITH A TURBOCHARGER HAVING A VARIABLE GEOMETRY TURBINE

The present invention relates to an internal combustion engine provided with a turbocharger having a variable geometry turbine and with a decompression-type braking system.

BACKGROUND OF THE INVENTION

Internal combustion engines are known, for example from DE-C-197 27 140, provided with a turbocharger having a variable geometry turbine and with a decompression-type braking system.

Decompression-type braking systems are based on the principle of dissipating the compression energy produced inside the engine cylinders to generate braking power; for example, this may be achieved by opening exhaust valves of the engine cylinders at the end of the compression stroke. The efficiency of this solution is increased by the supercharging provided by the turbocharger, which induces an increase in the compression power and, therefore, in braking power.

However, it is known that the efficiency of a turbine decreases as the flow rate of gases decreases, which depends on the angular velocity of the drive shaft (for brevity designated "engine speed" in the following); therefore, when the engine braking is actuated at low engine speed, as may happen for example when travelling downhill, the braking effect which can be obtained by decompression is unsatisfactory since the level of the induction pressure of the engine is low and the compression work dissipated is consequently modest.

With a view to improving the efficiency of the engine braking at low rpm, the use of turbochargers has been introduced, which are provided with a variable geometry turbine (VGT), i.e. comprising a rotor and an annular inlet nozzle in which is accommodated a bladed stator adapted to control the effective flow section of the nozzle or by varying the orientation of the blades, or by relative axial sliding between a flow cut-off element forming part of the stator and the nozzle itself.

The effective flow section is regulated as a function of the operating conditions of the engine; in particular, at low engine speeds the stator is maintained in a position of minimum effective flow section, thus bringing about an increase in the velocity of the gases impinging on the rotor. The speed of rotation of the turbine rotor (for brevity designated "turbine speed" in the following), which brings about an increase in the supercharging pressure.

At high engine speeds, high flow rates of exhaust gas pass through the turbine; with a view to maintaining the speed of the turbine at a safe level, i.e. at a level such that the turbocharger is not excessively loaded, and so as to contain the thermal stress of the engine and of the turbocharger, it is necessary to increase gradually the effective flow section of the nozzle so as to reduce the velocity at which said gases impinge on the rotor, and therefore to contain the speed of the turbine and the supercharging pressure.

According to DE-C-197 27 140, the effective flow section of the turbine is controlled by maintaining between preset limits a magnitude which is characteristic of the setting of the turbine defined as TBF=$A_T \cdot D_T/V_H$, wherein $A_T$ is the effective inlet flow section of the turbine, i.e. the controlled variable, $D_T$ is the inlet diameter of the turbine rotor and $V_H$ is the engine capacity. In particular, this magnitude is maintained below the value 0.005 and, preferably, is between 0.001 and 0.003.

The aforementioned control logic has the drawback of taking into account only geometrical factors of the engine (capacity) and of the turbine (inlet diameter) but not the operating conditions of the engine.

The result of this is that under certain operating conditions, and in particular close to the maximum permitted engine speed, the control which can be achieved with the above-described logic may lead to undesirable values of operating parameters of the engine and of the turbocharger in relation to which there are structural limitations.

SUMMARY OF THE INVENTION

It is the object of the present invention to devise an internal combustion engine provided with a turbocharger having a variable geometry turbine and with a decompression-type braking system, which makes it possible to eliminate the above-mentioned drawbacks.

This object is achieved by the present invention in that it relates to an internal combustion engine comprising:

a decompression-type braking device, a turbocharger provided with a variable geometry turbine having a rotor and an annular nozzle for directing the exhaust gases towards said rotor in which is disposed a bladed stator defining a variable effective flow section of said nozzle, an actuator for controlling the setting of said stator, and a control unit for controlling said actuator in response to an actuating signal for the decompression braking and as a function at least of the speed of said engine, so as to increase gradually said effective flow section from a minimum value maintained in a lower portion of the range of variation of the engine speed to a limit value under conditions of maximum braking power, characterised in that, with reference to said maximum braking power condition, said limit value is equal to at least one minimum safety value ($S_T$) defined by the equation $$\frac{T_0 \cdot P_i \cdot N_{T\max}}{T_i \cdot PME_{\max} \cdot N_{\max}} \cdot \frac{S_T \cdot D_T}{V} = K,$$

wherein:

$T_0$ (K) is the ambient temperature, $T_i$ (K) is the temperature of the gases at the turbine inlet under said maximum braking power condition, $p_i$ is the pressure of the gases at the turbine inlet under said maximum braking power condition, PME is a maximum design value of the mean effective pressure of the engine, $N_{Tmax}$ is a maximum permitted value of the turbine speed, $N_{max}$ is a maximum engine speed, $D_T$ is an inlet diameter of the turbine rotor, and V is the engine capacity, K is a non-dimensional constant between 0.0175 and 0.0230.

BRIEF DESCRIPTION OF THE DRAWINGS

With a view to a better understanding of the present invention a preferred embodiment will be described below with reference to the accompanying drawings, in which:

FIG. 2 and FIG. 3 are graphs showing the behaviour of operating magnitudes of the engine in FIG. 1 as a function of engine speed.

DETAILED DESCRIPTION OF THE INVENTION

Figure 1:
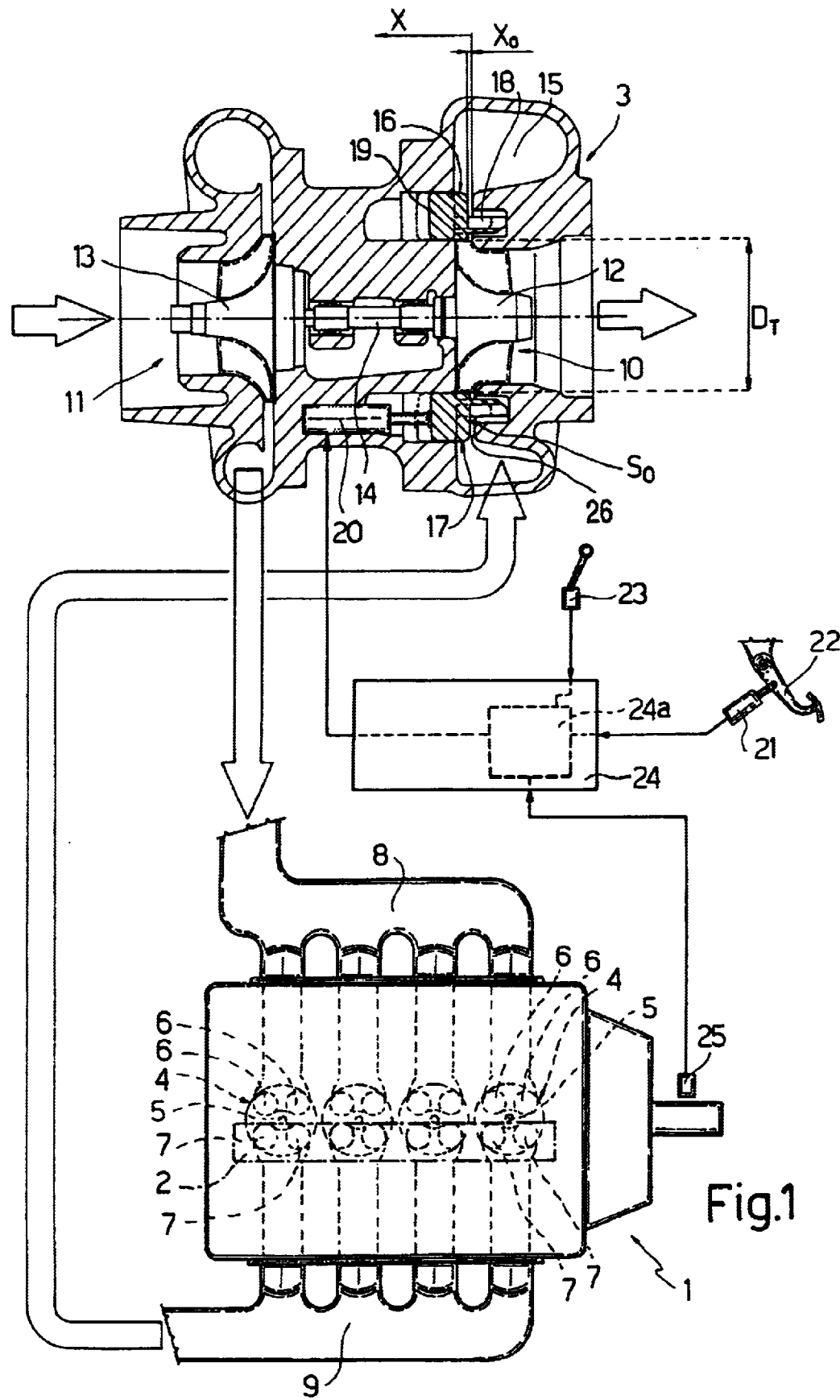
FIG. 1 illustrates functional diagram of an internal combustion engine provided with a turbocharger having a variable geometry turbine and with a decompression-type braking system in accordance with the present invention.

Referring to FIG. 1, the reference numeral 1 generally denotes an internal combustion engine of a vehicle, in particular a commercial vehicle, provided with a decompression-type braking device 2 and with a turbocharger 3.

The engine 1 comprises a plurality of cylinders 4, with each of which is associated an injector 5, a pair of inlet valves 6 and a pair of exhaust valves 7. The inlet valves 6 and exhaust valves 7 are connected to a respective inlet manifold 8 and exhaust manifold 9.

The decompression-type braking device 2, which is of a type known per se and is not described in detail, is adapted to vary the actuation of the exhaust valves 7, or to control the cyclical opening of an auxiliary valve, so as to induce a decompression in the cylinders 4 after the associated compression stroke. An example of such a device is illustrated in EP-A-0543210.

The turbocharger 3 comprises a variable geometry turbine 10 and a compressor 11 having respective rotors 12, 13 keyed on a common shaft 14.

The turbine 10 further comprises an annular inlet passage 15 connected with the exhaust manifold 9 of the engine 1, and a nozzle 17 for directing gases from the passage 15 to the rotor 12. In the nozzle 17 there is disposed a variable geometry annular bladed stator 16 comprising, in particular, a plurality of blades 18 and a collar 19 which is attached to the blades and which can move axially therewith between a retracted position (shown in dashed line in FIG. 1), in which the collar is removed axially from the nozzle 17 and the effective flow section of the gases is at maximum, and a forward position in FIG. 1, in which a considerable fraction of the nozzle is shut off by the collar 19 and the remaining effective flow section is at minimum.

The axial movement of the collar 19 is controlled by an electric actuator 20 controlled by an electronic control unit 24 for the engine 1, which control unit also controls the injectors 5 and the braking device 2 in a manner known per se.

In response to an actuating signal received from a switch 21 associated with a brake pedal 22, or from another manual operating device 23, the control unit 24 activates the decompression-type braking device 2 and prevents the injection of fuel into the cylinders 4; therefore, a braking action is obtained as result of the dissipation of the compression energy.

This braking action is augmented by the variable geometry turbine 10, the setting of which is controlled by the control unit 24 by means of the actuator 20 as a function of the engine speed N which is detected by way of a sensor 25.

In particular, in a range of engine speeds N below a threshold value where $N_0$ equals, for example, to 70–75% of the nominal speed $N_n$ of maximum power of the engine 1, the turbine 10 is maintained by the control unit 24 in a maximum closure setting, in which the collar 19 is the above-mentioned forward position and leaves free a minimum effective flow section $S_0$. In this way a back pressure is created which induces an increase in the compression energy of the engine. Furthermore, the velocity of the exhaust gases increases and thus the speed of the rotor 12; therefore, the supercharging effect is also intensified, which further increases the compression energy and thus the braking power.

As the engine speed and braking power increases, the aforementioned effects have to be controlled for the purpose of maintaining the speed of the turbine 10 at a safe level, i.e. at level such that the turbocharger is not overloaded, and so as to contain within preset limits the thermal stress of the engine 1 and of the turbocharger 2; in particular, it is necessary to increase gradually the effective flow section S so as to reduce the velocity at which the gases impinge on the rotor 12 and, therefore, the supercharging pressure.

Therefore, starting from an engine speed equal to $N_0$, the control unit 24 controls the actuator 20 so as to move back the collar 19 and leave free a gradually increasing effective flow section S. This section is defined by the expression:

$$S = n \cdot L \times x$$

wherein n is the number of the stator blades (and therefore of the compartments between the blades), L is the length (in circumferential direction) of each compartment and x is the free axial dimension of the compartments, i.e. the axial length of the gap $X_0$ formed between the gap 19 and the axially delimiting surface 26 on the side opposite the nozzle 17.

The maximum braking power condition is attained at the maximum engine speed $N_{max}$, which is higher than the nominal speed $N_n$ and, for example, is equal 120% of $N_n$.

According to the present invention, the minimum safety value $S_T$ of the effective flow section S under said maximum braking power condition is linked to geometrical and operating parameters of the engine 1 and of the turbocharger 3 by the equation:

$$\frac{T_0 \cdot p_i \cdot N_{T\max}}{T_i \cdot PME_{\max} \cdot N_{\max}} \cdot \frac{S_T \cdot D_T}{V} = K \qquad [2]$$

wherein K is a non-dimensional constant, the value of which according to the present invention is between 0.0175 and 0.0230, $T_0$ is the ambient temperature, equal to 293K, $T_i$ is the temperature of the gases at the turbine inlet under the maximum braking power condition, normally between 630K and 740K, depending on the type of engine and turbocharger, $p_i$ is the pressure of the gases at the turbine inlet under said maximum braking power condition, $PME_{max}$ is the maximum design value of the mean effective pressure of the engine, NT is the maximum permitted value of the turbine speed, $D_T$ is the inlet diameter of the rotor 12 of the turbine 10, and V is the engine capacity.

In said equation [2] the temperatures have to be expressed in degrees Kelvin. As a non-dimensional equation is involved, the other magnitudes can be expressed in any measurement units, provided that they are congruent; for example, the lengths in mm, the areas in mm², the volumes in mm³ (or, respectively, in cm, cm² and cm³ or m, m² and m³).

Preferably, the value of the constant K is between 0.020 and 0.022, and more preferably equal to about 0.021.

It was determined by numerical processing and verified experimentally that said value K does not change substantially with a variation in the structural and operating characteristics of the engine 1 and of the turbocharger 3, i.e. it remains valid for different engines and different limit values of the parameters. Therefore, said value links together the structural and design parameters of the engine and makes it possible to calculate, once the structural parameters are known and the design limit data have been set, the minimum value $S_T$ of the effective flow section of the nozzle 17, in conditions of maximum braking power, which may be compatible with said limit data.

The control of the section S is carried out, as described above, by varying the axial position of the collar 19 and thus the axial dimension x of the gap formed between the collar 19 and the axially delimiting surface 25 on the side opposite the nozzle 17. In particular, the actuator 20 is controlled by the unit 24 so as to maintain x at the minimum value $$x_0 = \frac{S_o}{n \cdot L}$$

up to the speed $N_0$ and thus to increase x up to the value $$x = \frac{S_T}{n \cdot L}$$

at the speed $N_{max}$ in accordance with a law stored in a processing and control block 24a of the unit 24. This law is suitably of linear type.

The advantages which can be achieved by the present invention are evident from a study of the qualitative graphs in FIGS. 2 and 3, which illustrate the behaviour of the turbine speed $N_T$ and of PME with variation in the engine speed N according to the present invention (solid lines) and according to the control technique indicated in the introduction to the description (dashed lines). It is readily apparent from the graphs that, according to the present invention, both $N_T$ and PME are maintained within the respective preset maximum values which are present in the equation [2], insofar as the effective flow section $S_T$ of the turbine under the maximum braking power condition is determined taking into account the aforementioned values. On the contrary, according to the known art, since this section is calculated exclusively on the basis of geometrical parameters of the engine and of the turbocharger, undesirable values may be obtained for the operating parameters, for example $N_T$ and PME.

Furthermore, since the control according to the present invention takes into account both the geometrical and operating parameters, the equation [2] can be applied to various types of engines and, with equal geometrical characteristics of the engine, it may enable the control of the geometry of the turbine to be adapted to various limit values of the operating parameters.

Finally, it is evident that the present invention can be subject to modifications and variations without departing from the scope of protection of the claims.

In particular, the variation in effective flow section may be achieved by modifying by means of the actuator 24 the inclination of the blades of the turbine 10 so as to vary the effective width of the compartments between them and the angle of incidence of the gases on the rotor, rather than by means of an axial displacement of the stator.

Furthermore, the variation in flow section from the minimum value $S_0$ to the value $S_T$ assumed under conditions of maximum braking power may be undertaken in accordance with a non-linear law, for example by mapping as a function of engine speed and, optionally, one or more further operating parameters.

What is claimed is:

1. An internal combustion engine (1) comprising:
   a decompression-type braking device (2),
   a turbocharger (3) provided with a variable geometry turbine (10) having a rotor (12) and an annular nozzle (17) for directing exhaust gases towards said rotor (12) in which is disposed a bladed stator (16) defining a variable effective flow section (S) of said nozzle (17),
   an actuator (20) for controlling the setting of said stator (16), and
   a control unit (24) for controlling said actuator (20) in response to an actuating signal for the decompression braking and as a function at least of the speed (N) of said engine (1), so as to increase gradually said effective flow section (S) from a minimum value ($S_0$) maintained in a lower portion of the range of variation of the speed of the engine (1) to a limit value under conditions of maximum braking power,
   characterized in that, with reference to said maximum braking power condition, said limit value is equal to at least one minimum safety value ($S_T$) by the equation $$\frac{T_0 \cdot P_i \cdot N_{T\max}}{T_i \cdot PME_{\max} \cdot N_{\max}} \cdot \frac{S_T \cdot D_T}{V} = K,$$

wherein:
   $T_0$ is the ambient temperature,
   $T_1$ is the temperature of the gases at the inlet of the turbine (10) under said maximum braking power condition,
   $P_i$ is the pressure of the gases at the inlet of the turbine (10) under said maximum braking power condition,
   $PME_{max}$ is a maximum design value of the mean effective pressure of the engine (1),
   $N_{Tmax}$ is a maximum permitted value of the speed of the turbine (10),
   $N_{max}$ is a maximum speed of the engine (1),
   $D_T$ is an inlet diameter of the rotor (12) of the turbine (10),
   V is the capacity of the engine (1), and
   K is a non-dimensional constant between 0.0175 and 0.0230.

2. The internal combustion engine according to claim 1, characterized in that said constant K is between 0.020 and 0.022.

3. The internal combustion engine according to claim 1, characterized in that said constant K is equal to approximately 0.021.

4. The internal combustion engine according to claim 1, characterized in that said lower portion of the range of speed variation is limited upwardly by a threshold value ($N_0$) of between 65 and 80% of the nominal speed ($N_n$) of maximum power of said engine (1).

5. The internal combustion engine according to claim 4, characterized in that said threshold value ($N_0$) is between 70 and 75% of said nominal speed ($N_n$) of the engine (1).

6. The internal combustion engine according to claim 5, characterized in that said maximum braking power condition is achieved at a maximum speed ($N_{max}$) of the engine (1) between 110% and 130% of said nominal speed ($N_n$) of the engine (1).

7. The internal combustion engine according to claim 4, characterized in that said control unit (24) comprises processing and control means (24a) for linearly varying said effective flow section (S) from said minimum value (So) to said limit value as the speed (N) of the engine (1) increase.

8. The internal combustion engine according to claim 1, characterized in that said stator (17) comprises an annular collar (19) and a plurality of blades (18) extending axially from said collar, said collar being movable axially in said nozzle (17) under the pressure of said actuator (20) so as to vary said effective said nozzle (S) of said nozzle (17).

9. The internal combustion engine according to claim 1, characterized in that said stator (16) comprises a plurality of blades (18) having variable inclination controlled by said actuator (20).

* * * * *